United States Patent
Hirabe et al.

(10) Patent No.: US 10,177,829 B2
(45) Date of Patent: Jan. 8, 2019

(54) WIRELESS SIGNAL TRANSMITTING ANTENNA, WIRELESS SIGNAL RECEIVING ANTENNA, WIRELESS SIGNAL TRANSMITTING SYSTEM, WIRELESS SIGNAL TRANSMITTING METHOD, AND WIRELESS SIGNAL RECEIVING METHOD

(71) Applicant: NEC CORPORATION, Tokyo (JP)

(72) Inventors: Masashi Hirabe, Tokyo (JP); Tsuguo Maru, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/519,955

(22) PCT Filed: Oct. 22, 2014

(86) PCT No.: PCT/JP2014/005369
§ 371 (c)(1),
(2) Date: Apr. 18, 2017

(87) PCT Pub. No.: WO2016/063315
PCT Pub. Date: Apr. 28, 2016

(65) Prior Publication Data
US 2017/0331543 A1      Nov. 16, 2017

(51) Int. Cl.
*H04B 7/02* (2018.01)
*H04B 7/06* (2006.01)
(Continued)

(52) U.S. Cl.
CPC .......... *H04B 7/0682* (2013.01); *H01Q 3/30* (2013.01); *H01Q 21/20* (2013.01); *H04B 7/02* (2013.01); *H04L 5/0007* (2013.01); *H04L 5/04* (2013.01)

(58) Field of Classification Search
CPC ...... H04B 7/02; H04B 7/0682; H04B 1/0483; H04B 7/0082
See application file for complete search history.

(56) References Cited

U.S. PATENT DOCUMENTS 3,562,756 A      2/1971  Kuo et al.
9,553,687 B1 *   1/2017  Graceffo .................. H04J 11/00

FOREIGN PATENT DOCUMENTS

GB    2410130 A       7/2005
WO    2012/084039 A1  6/2012
WO    2014/104911 A1  7/2014

OTHER PUBLICATIONS

Ove Edfors et al., "Is Orbital Angular Momentum (OAM) Based Radio Communication an Unexploited Area?", IEEE Transactions on Antennas and Propagation, IEEE Service Center, vol. 60, No. 2, Feb. 1, 2012, pp. 1126-1131, XP 011403555 ( 6 pages total).

(Continued)

*Primary Examiner* — Tuan Pham
(74) *Attorney, Agent, or Firm* — Sughrue Mion, PLLC

(57) ABSTRACT

When wireless communication is performed, a signal can be formed into a spiral beam (H), the spiral pitch of the signal can be changed, and a plurality of spiral beams (H) with different spiral pitches can be transmitted and received. A wireless signal transmitting antenna (10) includes a signal emitting means (A) having N number of antenna elements (A1, ..., AN) (where N is an integer satisfying N≥2) equally spaced on a circumference of circle, and a signal distribution means (B) for generating, from an input first signal (S), N number of second signals (G1, ..., GN) having a phase difference from one another and outputting the N number of second signals (G1, ..., GN) to the N number of antenna elements (A1, ..., AN), respectively, so that a spiral beam (H) with the equiphase surface inclined spirally is output from the signal emitting means (A).

6 Claims, 16 Drawing Sheets

(51) Int. Cl.
*H01Q 3/30* (2006.01)
*H01Q 21/20* (2006.01)
*H04L 5/00* (2006.01)
*H04L 5/04* (2006.01)

(56) References Cited

OTHER PUBLICATIONS

Communication dated Sep. 15, 2017 issued by the European Patent Office in counterpart application No. 14904344.0.
"BR witnesses experiment on Radio Orbital Angular Momentum (OAM) with potential for drastic improvement in spectrum efficiency", ITU, Internet (URL: http://www.itu.int/en/ITU-R/trends/OAM/Pages/default.aspx), 3 pages.
Fabrizio Tamburini, et al. "Encoding many channels on the same frequency through radio vorticity: first experimental test", New Journal of Physics, Mar. 2012, 26 pages, vol. 14. Internet (URL: http://iopscience.iop.org/1367-2630/14/3/033001.
Q. Bai, et al., "Experimental circular phased array for generating OAM radio beams", Electronics Letters, Sep. 25, 2014, pp. 1414-1415, vol. 50, No. 20.
Baptiste Palacin, et al., "An 8×8 Butler Matrix for Generation of Waves Carrying Orbital Angular Momentum", The 8th European Conference on Antennas and Propagation digest, Apr. 2014, pp. 2814-2818.
International Search Report for PCT/JP2014/005369 dated Jan. 20, 2015 [PCT/ISA/210].
Communication dated Mar. 6, 2018 from the Russian Patent and Trademark office in counterpart application No. 2017114631/28.

\* cited by examiner

WIRELESS SIGNAL TRANSMITTING ANTENNA, WIRELESS SIGNAL RECEIVING ANTENNA, WIRELESS SIGNAL TRANSMITTING SYSTEM, WIRELESS SIGNAL TRANSMITTING METHOD, AND WIRELESS SIGNAL RECEIVING METHOD

CROSS REFERENCE TO RELATED APPLICATIONS

This application is a National Stage of International Application No. PCT/JP2014/005369, filed on Oct. 22, 2014, the contents of all of which are incorporated herein by reference in their entirety.

TECHNICAL FIELD

The present invention relates to a wireless signal transmitting antenna, a wireless signal receiving antenna, a wireless signal transmitting system, a wireless signal transmitting method, and a wireless signal receiving method that form signals into spiral beams and wirelessly communicate them.

BACKGROUND ART

Communications in the range of frequencies currently used for wireless communications are approaching the limit. To solve this problem, the communication technology that adds the orbital angular momentum (OAM) to wireless signals to form signals into spiral beams and transmits and receives them is under study. The signals which are formed into spiral beams have the characteristics that the equiphase surface is twisted in a spiral form. By changing the spiral pitch of the equiphase surface of spiral beams, it is possible to form infinite orthogonal mode signals. Therefore, by use of spiral beams for wireless communications, it is possible to perform multiple communications over the same frequency, thereby achieving higher-speed and higher-capacity communications.

The study on communications using signals in spiral beams to which the orbital angular momentum is added is disclosed in Non Patent Literature 1 and Non Patent Literature 2, for example. Non Patent Literature 1 discloses formation of a spiral beam where the orbital angular momentum is added to a signal by use of an OAM antenna 50 having a reflecting unit 51 where a cut is made in a part of a parabolic antenna as shown in FIG. 16. Non Patent Literature 2 discloses the experiment showing that, as a result of forming a spiral beam using the OAM antenna 50 and transmitting a signal, this signal can be received at a receiving point located at a long distance.

CITATION LIST

Non Patent Literature

NPL1: "BR witnesses experiment on Radio Orbital Angular Momentum (OAM) with potential for drastic improvement in spectrum efficiency", ITU, Internet (URL: http://www.itu.int/en/ITU-R/trends/OAM/Pages/default.aspx)
NPL2: Fabrizio Tamburini, and five others, New Journal of Physics 2012 Mar. 1 "Encoding many channels on the same frequency through radio vorticity: first experimental test", Internet (URL: http://iopscience.iop.org/1367-2630/14/3/033001)

SUMMARY OF INVENTION

Technical Problem

According to the OAM antenna 50 disclosed in Non Patent Literature 1 and Non Patent Literature 2, it is possible to form a spiral beam and transmit a signal. For actual high-speed and high-capacity communications, multiplexing of a plurality of spiral beams with different spiral pitches is required. However, because the OAM antenna 50 physically forms a spiral beam by using the reflecting unit 51 where a cut is made in a part of a parabolic antenna, it is not possible to change the spiral pitch of the spiral beam. Thus, the OAM antenna disclosed in Non Patent Literature 1 and Non Patent Literature 2 has a problem that it is not possible to form a plurality of spiral beams with different spiral pitches.

An exemplary object of the present invention is to provide a wireless signal transmitting antenna, a wireless signal receiving antenna, a wireless signal transmitting system, a wireless signal transmitting method, and a wireless signal receiving method that can, for wireless communications, form a signal into a spiral beam and change the spiral pitch of the signal, and further can use a plurality of spiral beams with different spiral pitches simultaneously for wireless communications.

Solution to Problem

One exemplary aspect of the present invention is a wireless signal transmitting antenna including a signal emitting means having N number of antenna elements (where N is an integer satisfying N≥2) equally spaced on a circumference of circle; and a signal distribution means for generating, from an input first signal, N number of second signals having a phase difference from one another and outputting the N number of second signals to the N number of antenna elements, respectively, so that a spiral beam with an equiphase surface inclined spirally is output from the signal emitting means.

One exemplary aspect of the present invention is a wireless signal receiving antenna including a signal receiving means having X number of antenna elements (where X is an integer satisfying X≥2) equally spaced on a circumference of circle; and a signal synthesis means for receiving, as X number of second signals, spiral beams with equiphase surfaces inclined spirally received by the signal receiving means from the X number of antenna elements, respectively, adding a phase difference to each of the X number of second signals, and synthesizing and outputting a first signal.

One exemplary aspect of the present invention is a wireless signal transmitting method including generating, from an input first signal, N number of second signals having a phase difference from one another; and outputting the N number of second signals to N number of antenna elements, respectively, so that a spiral beam with an equiphase surface inclined spirally is output from a signal emitting means having the N number of antenna elements (where N is an integer satisfying N≥2) equally spaced on a circumference of circle.

One exemplary aspect of the present invention is a wireless signal receiving method including receiving, as X number of second signals, a spiral beam with equiphase surface received by a signal receiving means having X number of antenna elements (where X is an integer satisfying X≥2) equally spaced on a circumference of circle from the X number of antenna elements, respectively, adding a phase difference to each of the X number of second signals, synthesizing a first signal therefrom and outputting the first signal.

One exemplary aspect of the present invention is a wireless signal transmitting system including a signal emitting means for outputting a transmission signal by N number of antenna elements (where N is an integer satisfying N≥2); and a signal distribution means for generating, from an input first signal, N number of second signals having a phase difference from one another, and outputting the N number of second signals to the N number of antenna elements, respectively, wherein the N number of antenna elements are equally spaced on a circumference of circle.

Advantageous Effects of Invention

According to the wireless signal transmitting antenna, the wireless signal receiving antenna, the wireless signal transmitting system, the wireless signal transmitting method and the wireless signal receiving method according to the exemplary aspects of the present invention, it is possible to form a signal into a spiral beam and change the spiral pitch of the signal for wireless communications, and further to use a plurality of spiral beams with different spiral pitches simultaneously for wireless communications.

DESCRIPTION OF EMBODIMENTS

First Exemplary Embodiment

Exemplary embodiments of the present invention are described hereinafter with reference to the drawings.

First Exemplary Embodiment

Figure 1:
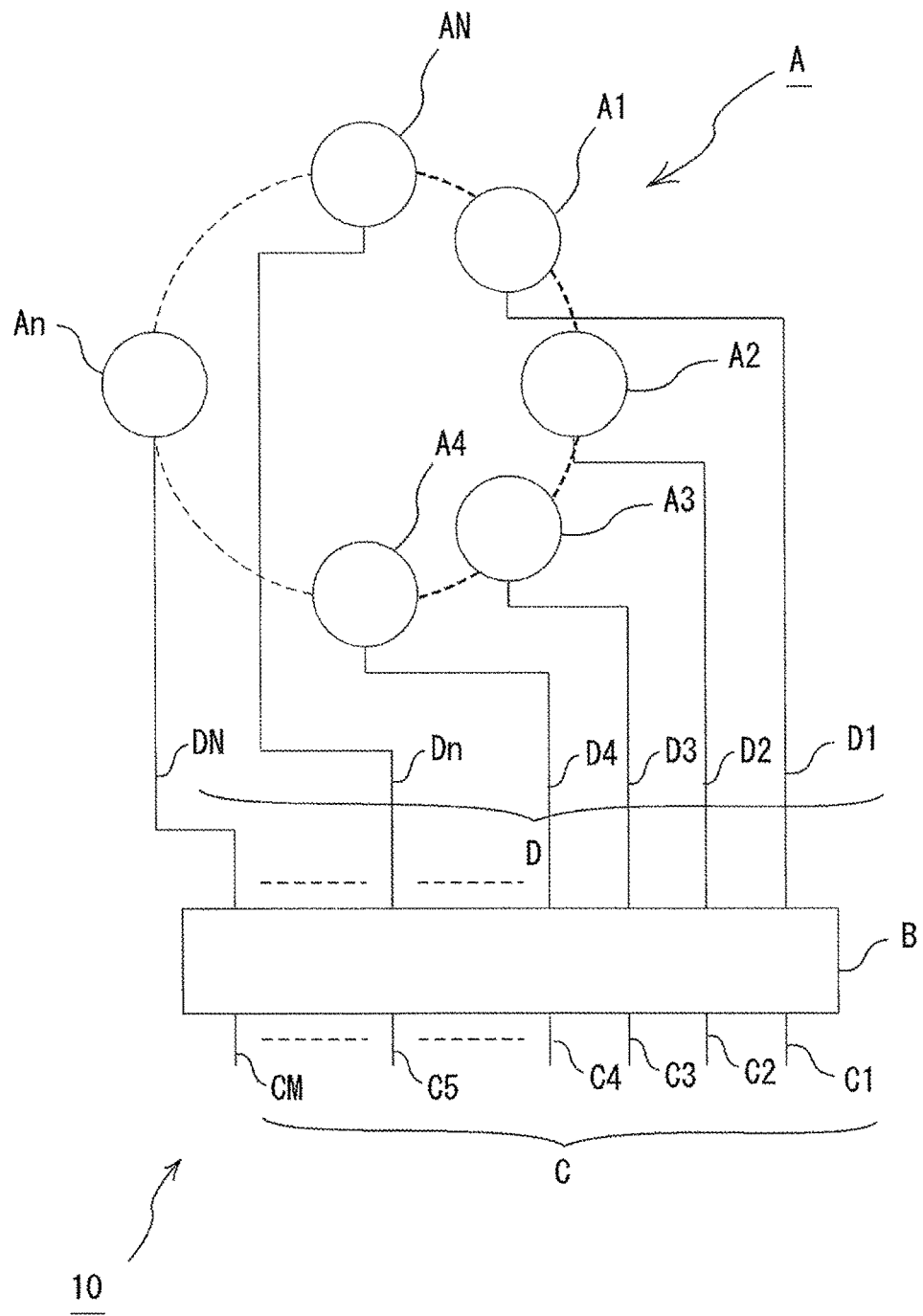
FIG. 1 is a view showing the structure of a wireless transmitting antenna according to a first exemplary embodiment.

As shown in FIG. 1, a wireless transmitting antenna (wireless transmitting system) 10 includes a signal emitting means A having N number of antenna elements A1, A2, ..., AN (where N is an integer of 2 or more) that are equally spaced on the circumference of circle, a signal input port (signal input means) C for inputting first signals S1, ..., SM, and a signal distribution circuit (signal distribution means) B for distributing the input first signals S1, ..., SM to N number of second signals S2 with equal power and outputs them to the antenna elements A1, A2, ..., AN, respectively. By this structure, the wireless transmitting antenna 10 can form and transmit, from the input first signals S1, ..., SM, a transmission signal in a spiral beam by the antenna elements A1, A2, ..., AN.

Figure 16:
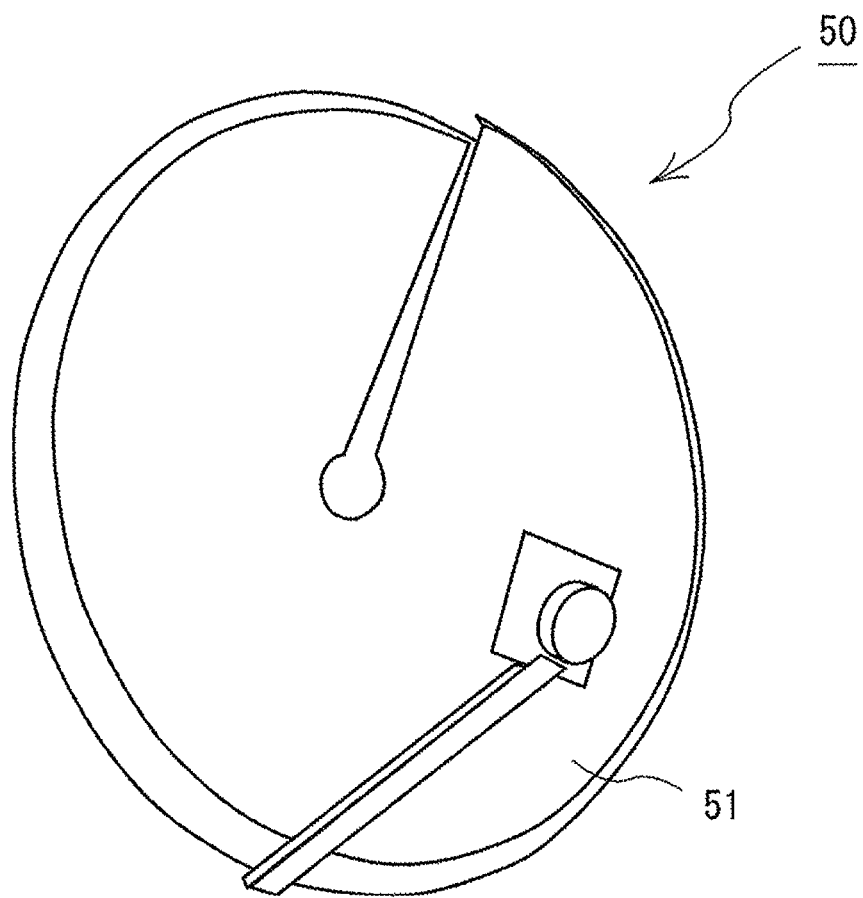
FIG. 16 is a view showing an OAM antenna according to related art.

The antenna elements A1, ..., AN are equally spaced on the circumference of circle with a diameter of 30 cm, for example. Those plurality of antenna elements A1, ..., AN constitute the signal emitting means A. The signal emitting means A corresponds to the reflecting unit 51, which is a parabolic antenna with a cut shown in FIG. 16. A parabolic antenna may be used as each of the antenna elements A1, ..., AN, for example. The signal emitting means A and the signal distribution circuit B are connected through a signal waveguide D. The signal waveguide D has N number of signal lines D1, ..., DN with equal length. The signal lines D1, ..., DN connect N number of signal emitting ports B1, ..., BN of the signal distribution circuit B and the antenna elements A1, ..., AN. Coaxial cables or waveguides may be used as the signal lines D1, ..., DN.

The signal distribution circuit B distributes the first signal S that is input from any of the plurality of signal input ports C1, ..., CM to N number of second signals G1, ..., GN with equal power and emit them from the signal emitting ports B1, ..., BN. A Butler matrix feeding circuit, for example, may be used as the signal distribution circuit B. The Butler matrix is generally known to be used for changing the direction of transmitting beams.

Figure 2:
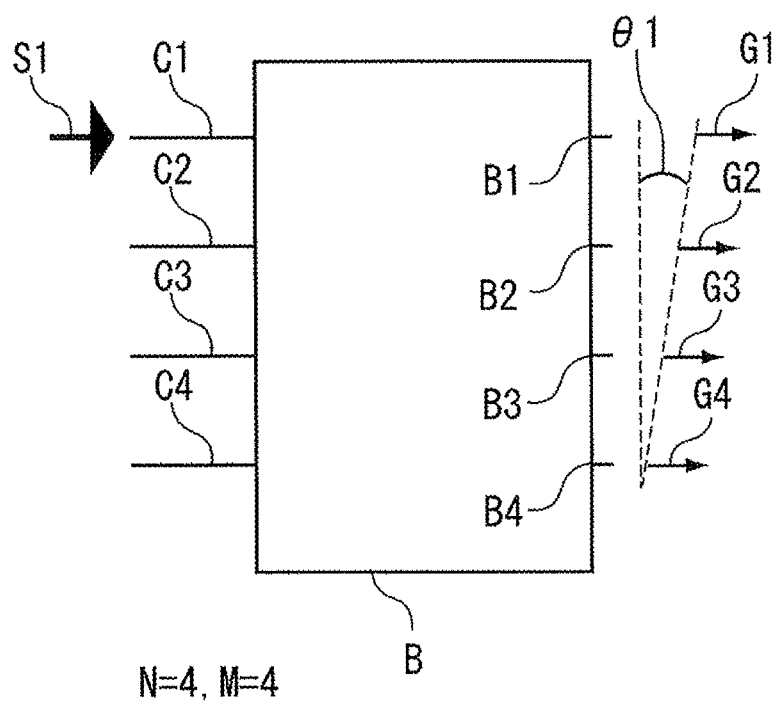
FIG. 2 is a view showing the principle of a signal distribution circuit using a Butler matrix feeding circuit.

As shown in FIG. 2, according to the signal distribution circuit B using a Butler matrix feeding circuit, when the first signal S1 is input from the signal input port C1, N number of second signals G1, ..., GN with equal power are output in a distributed manner from the signal emitting ports B1, ..., BN. At this time, the signal distribution circuit B adds a phase difference with a linear slope θ1 to the N number of second signals G1, ..., GN to be emitted from the signal emitting ports B1, ..., BN. A spiral beam H is formed using such properties. To be specific, the signal lines D1, ..., DN with equal length are connected from the signal emitting ports B1, ..., BN to the antenna elements A1, ..., AN (see FIG. 1).

Figure 3:
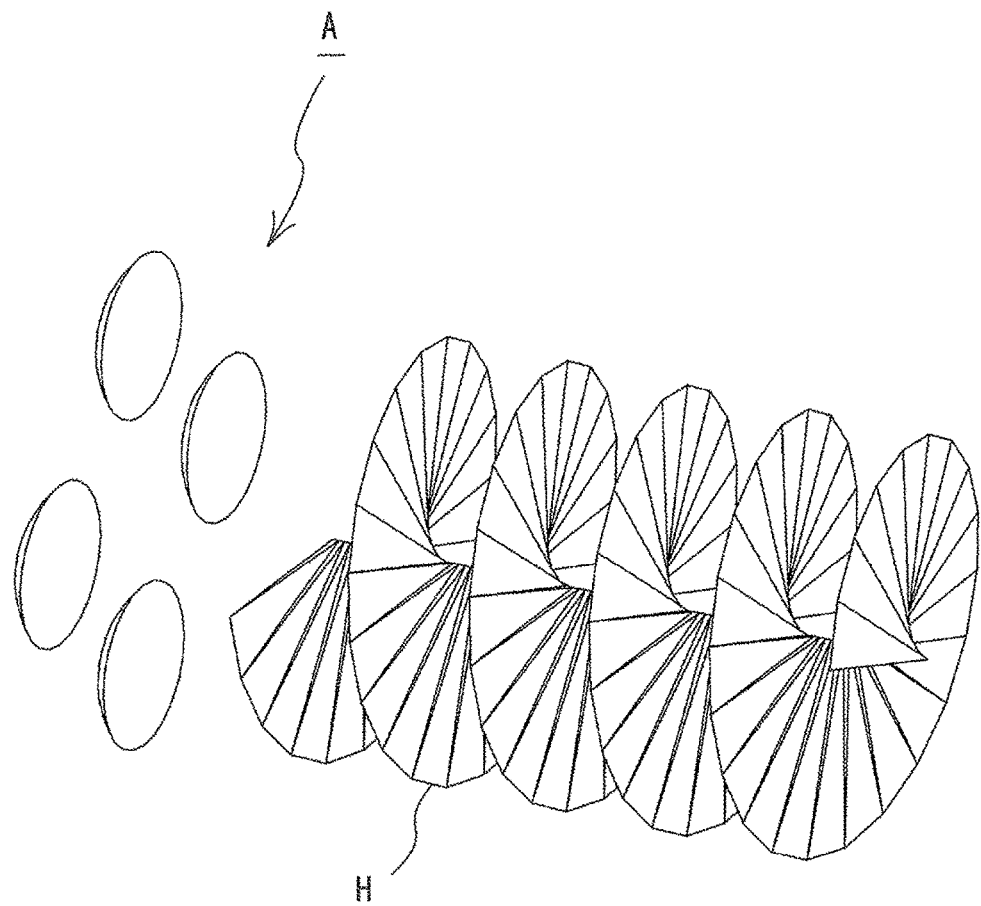
FIG. 3 is a view showing the way a spiral beam is formed by a signal emitting means A.

Further, the antenna elements A1, ..., AN are equally spaced on the circumference of circle. Thus, when the second signals G1, . . . , GN are emitted from the antenna elements A1, . . . , AN sequentially at specified intervals in a certain twist direction (rightward twist or leftward twist), the spiral beam H is formed from the signal emitting means A as shown in FIG. 3. The direction of twist of the spiral beam is changed according to the correspondence between the antenna elements A1, . . . , AN and the signal lines D1, . . . , DN. The mode of the OAM to form the spiral beam H involves the case of N=2. In the case of N=2, the twist direction may be any of rightward twist and leftward twist. In the case of N=3 or more, the twist direction of the spiral beam H can be determined.

Figure 4:
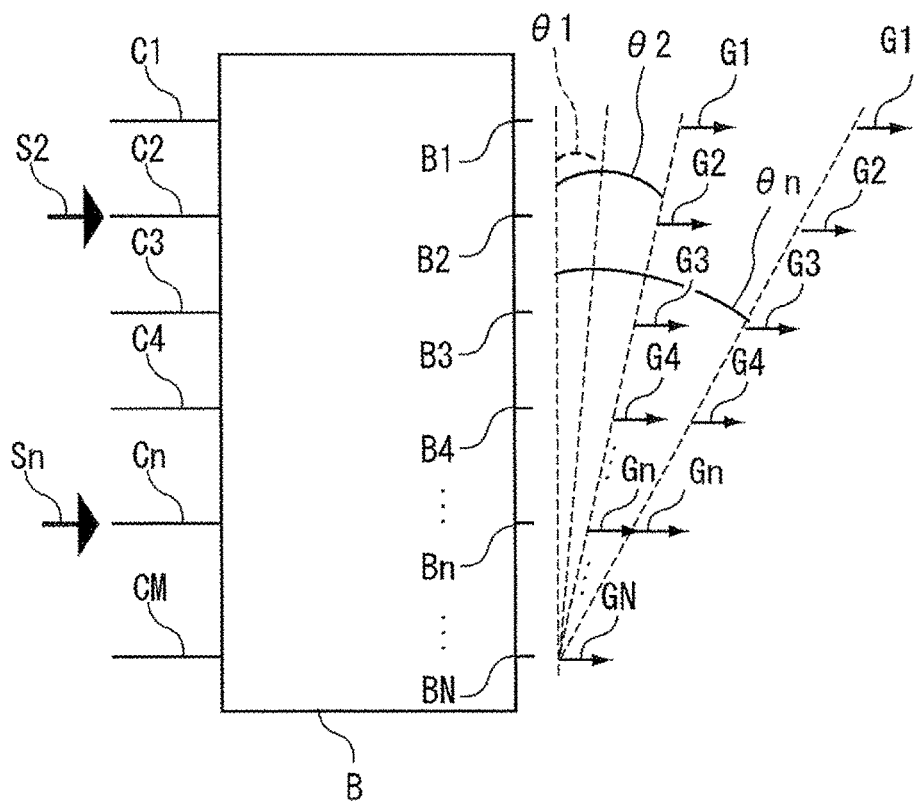
FIG. 4 is a view showing the principle of a signal distribution circuit using a Butler matrix feeding circuit with a plurality of input ports.

As shown in FIG. 4, the Butler matrix generally has a plurality of signal input ports C1, . . . , CM (where M is a positive integer satisfying M≤N), and by changing the signal input ports C1, . . . , CM for inputting the first signals S1, . . . , SM, it is possible to change the slope ON of a linearly sloped phase difference that appears at the signal emitting ports B1, . . . , BN. For example, the first signal S2 that is input to the signal input port C2 is output as the second signals G1, . . . , GN to which a phase difference with a linear slope θ2 is added. Using such properties, the spiral pitch of the spiral beam H can be changed corresponding to the signal input ports C1, . . . , CM. Thus, it is possible to form a signal to be output from the signal emitting means A as the spiral beam H having the spiral pitch corresponding to the signal input ports C1, . . . , CM, the equiphase surface of which is inclined spirally.

Specifically, the signal distribution circuit B generates, from the input first signal S, the N number of second signals G1, . . . , GN having a phase difference from one another, and outputs the N number of second signals G1, . . . , GN to the N number of antenna elements A1, . . . , AN, respectively, so that the spiral beam H, the equiphase surface of which is inclined spirally, is output from the signal emitting means A. At this time, the signal distribution circuit B distributes the signal so that the second signals G1, . . . , GN having a specified phase difference, the phase difference increasing in incremental steps (by equal differences) in the circumferential direction, are input to the antenna elements A1, . . . , AN that are adjacent in the signal emitting means A. Although an example of using a Butler matrix feeding circuit for the signal distribution circuit B is shown in the above description, any circuit may be used as long as it can output the second signals G1, . . . , GN so that the spiral beam H is formed from each of the antenna elements A1, . . . , AN that are equally spaced on the circumference of circle. Further, the phase differences added to the second signals are not necessarily at equal intervals (at equal differences).

Figure 5:
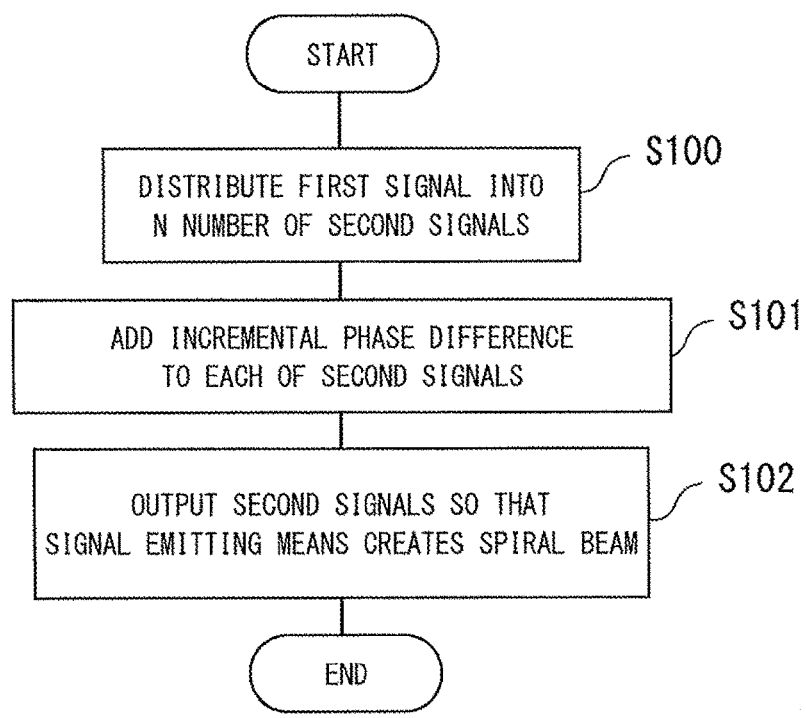
FIG. 5 is a flowchart showing a process of forming a spiral beam by the wireless transmitting antenna.

A process of a wireless transmitting method that forms the spiral beam H by the wireless transmitting antenna 10 is briefly described hereinafter with reference to FIG. 5.

In the wireless transmitting antenna 10, the signal distribution circuit B distributes the first signal S that is input to any of the signal input ports C1, . . . , CM into the N number of second signals G1, . . . , GN with equal power (S100). The signal distribution circuit B adds an incremental phase difference to each of the N number of second signals G1, . . . , GN to be output (S101). The signal distribution circuit B distributes the N number of second signals G1, . . . , GN to the N number of antenna elements A1, . . ., AN, respectively, so that the spiral beam H, the equiphase surface of which is inclined spirally, is formed from the signal emitting means A (S102).

As described above, according to the wireless transmitting antenna 10, the signal that is output from each of the antenna elements A1, . . . , AN can be formed as the spiral beam H whose equiphase surface is inclined spirally. Further, according to the wireless transmitting antenna 10, when forming the signal into the spiral beam H, the spiral pitch of the spiral beam H can be changed arbitrarily.

Second Exemplary Embodiment

In the first exemplary embodiment, the signal that is output from each of the antenna elements A1, . . . , AN is formed as the spiral beam having the spiral pitch corresponding to the signal input ports C1, . . . , CM, the equiphase surface of which is inclined spirally, in the wireless transmitting antenna 10. In this exemplary embodiment, a plurality of spiral beams having different spiral pitches are formed using the wireless transmitting antenna 10 for multiplexing communications. In the following description, the same names and symbols are used for the parts that are the same as those in the first exemplary embodiment, and the redundant description is omitted as appropriate.

Figure 6:
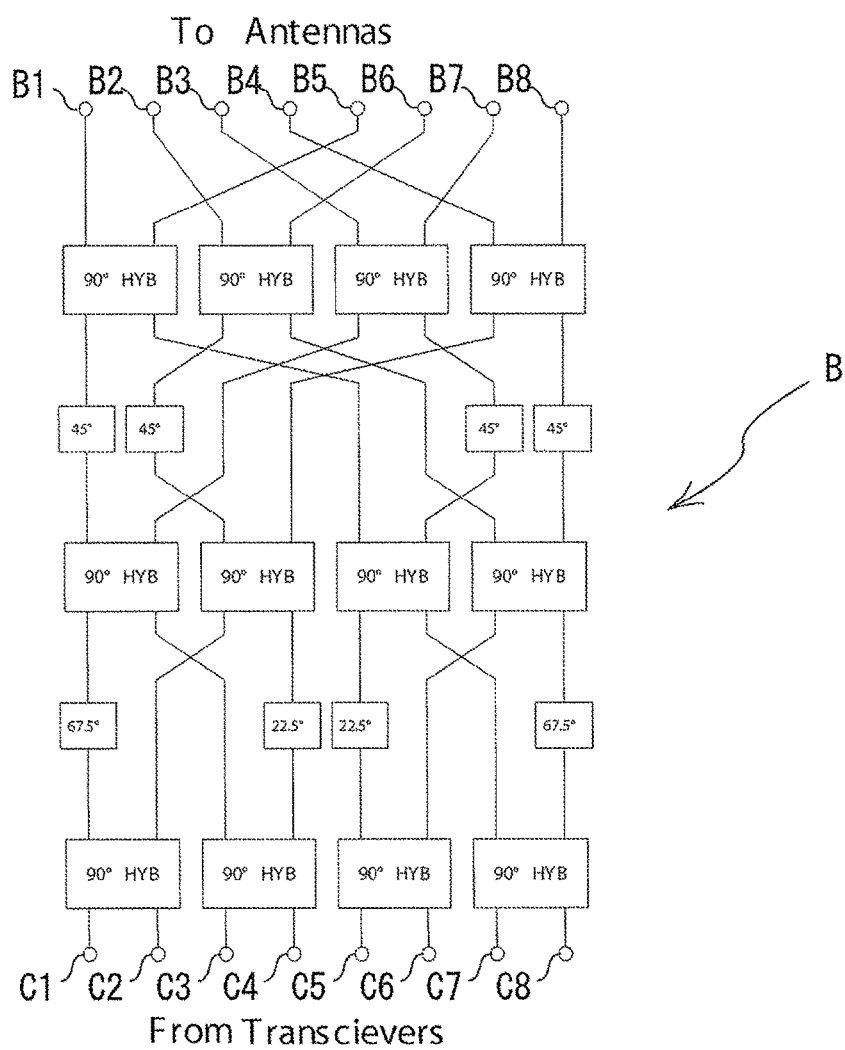
FIG. 6 is a view showing the structure of a signal distribution circuit included in a wireless transmitting antenna according to a second exemplary embodiment.

As shown in FIG. 6, the wireless transmitting antenna 10 includes a signal distribution circuit B that has a plurality of signal input ports C1, . . . , CM and a plurality of signal emitting ports B1, . . . , BN. The structure of the signal distribution circuit B which has an 8 (=M) input, 8 (=N) output Butler matrix feeding circuit is shown in this example. When the first signals S1, . . . , SM are input to any of the signal input ports C1, . . . , CM, phase differences with different linear slopes are added thereto, and N number of second signals G1, . . . , GN with equal power are output from the signal emitting ports B1, . . . , BN, respectively (see FIG. 4). Thus, from the input first signal S, M number of spiral beams H1, . . . , HM with different spiral pitches are formed corresponding to the signal input ports C1, . . . , CM.

Figure 7:
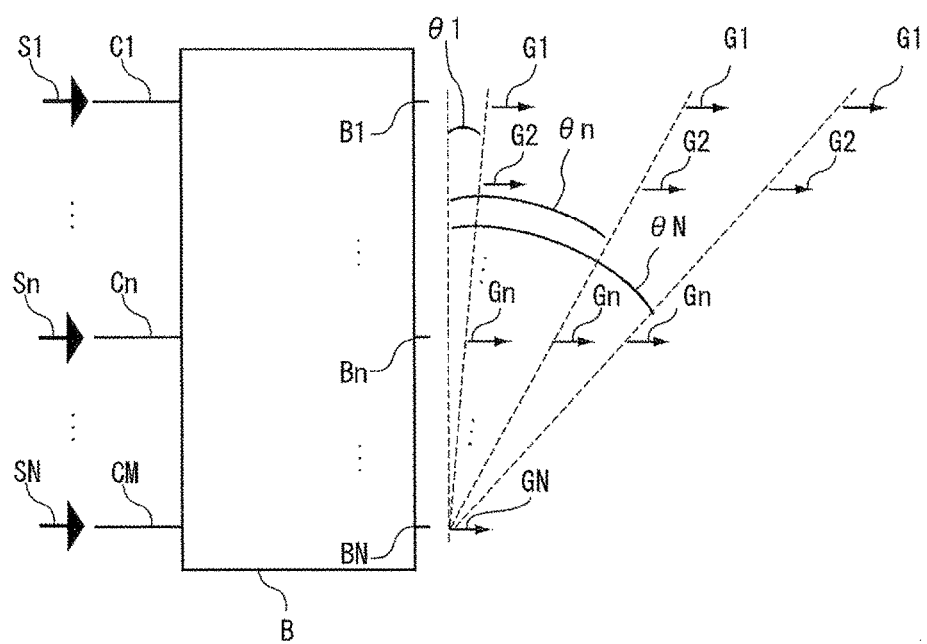
FIG. 7 is a view showing the state where M number of different first signals are input to the wireless transmitting antenna.

As shown in FIG. 7, when M number of different first signals S1, . . . , SM are respectively input to the M number of signal input ports C1, . . . , CM, phase differences with different linear slopes θ1, . . . , θN are added respectively to the N number of second signals G1, . . . , GN with equal power corresponding to the signal input ports C1, . . . , CM, and the N number of second signals G1, . . . , GN with equal power are respectively output from the signal emitting ports B1, . . . , BN. The second signals G1, . . . , GN corresponding to the signal input ports C1, . . . , CM are sequentially output from the antenna elements A1, . . . , AN at specified times at equal intervals, and M number of spiral beams H1, . . . , HM with different spiral pitches are thereby formed simultaneously. Therefore, the wireless transmitting antenna 10 can simultaneously multiplex and transmit the plurality of spiral beams H1, . . . , HM.

Figure 8:
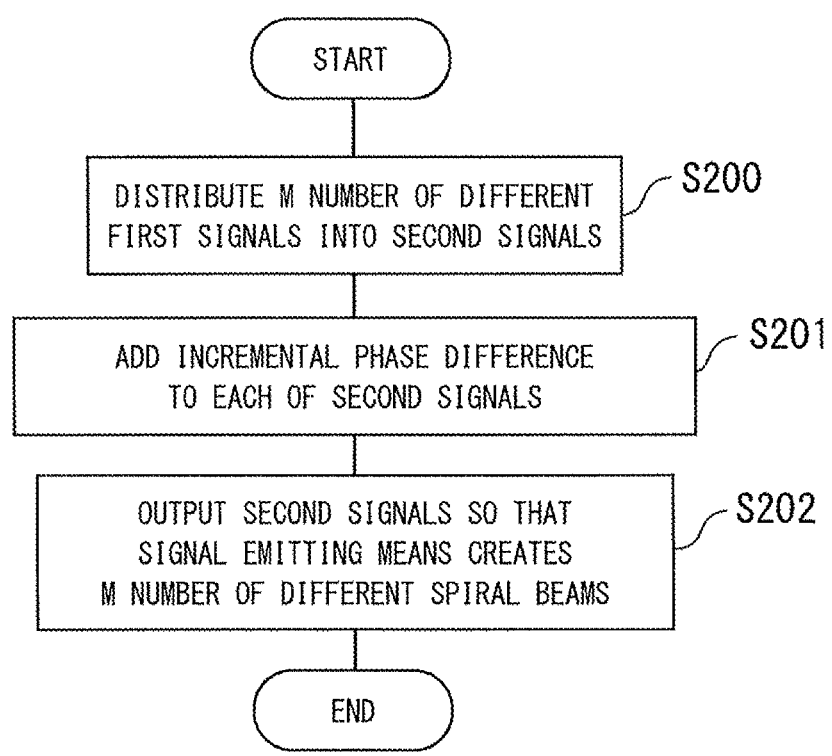
FIG. 8 is a flowchart showing a process of forming M number of different spiral beams by the wireless transmitting antenna.

A process of a wireless transmitting method that forms the plurality of spiral beams H with different spiral pitches by the wireless transmitting antenna 10 is briefly described hereinafter with reference to FIG. 8.

In the wireless transmitting antenna 10, the signal distribution circuit B distributes and outputs each of the M number of different first signals S1, . . . , SM that are input to each of the signal input ports C1, . . . , CM into the N number of second signals G1, . . . , GN with equal power corresponding to the signal input ports C1, . . . , CM (S200). The signal distribution circuit B adds a different incremental phase difference to each of the N number of distributed second signals G1, . . . , GN and outputs them from the signal emitting ports B1, . . . , BN (S201). The signal distribution circuit B distributes the second signals G1, . . . , GN to the N number of antenna elements A1, . . . , AN, respectively, so that the signal emitting means A forms the M number of different spiral beams H, the equiphase surfaces of which are inclined spirally (S202).

As described above, according to the wireless transmitting antenna 10, it is possible to simultaneously multiplex and transmit the plurality of spiral beams H1, ..., HM.

Third Exemplary Embodiment

An antenna that has the same structure as the wireless transmitting antenna 10 can be used also as a receiving antenna for the wireless transmitting antenna 10.

Figure 9:
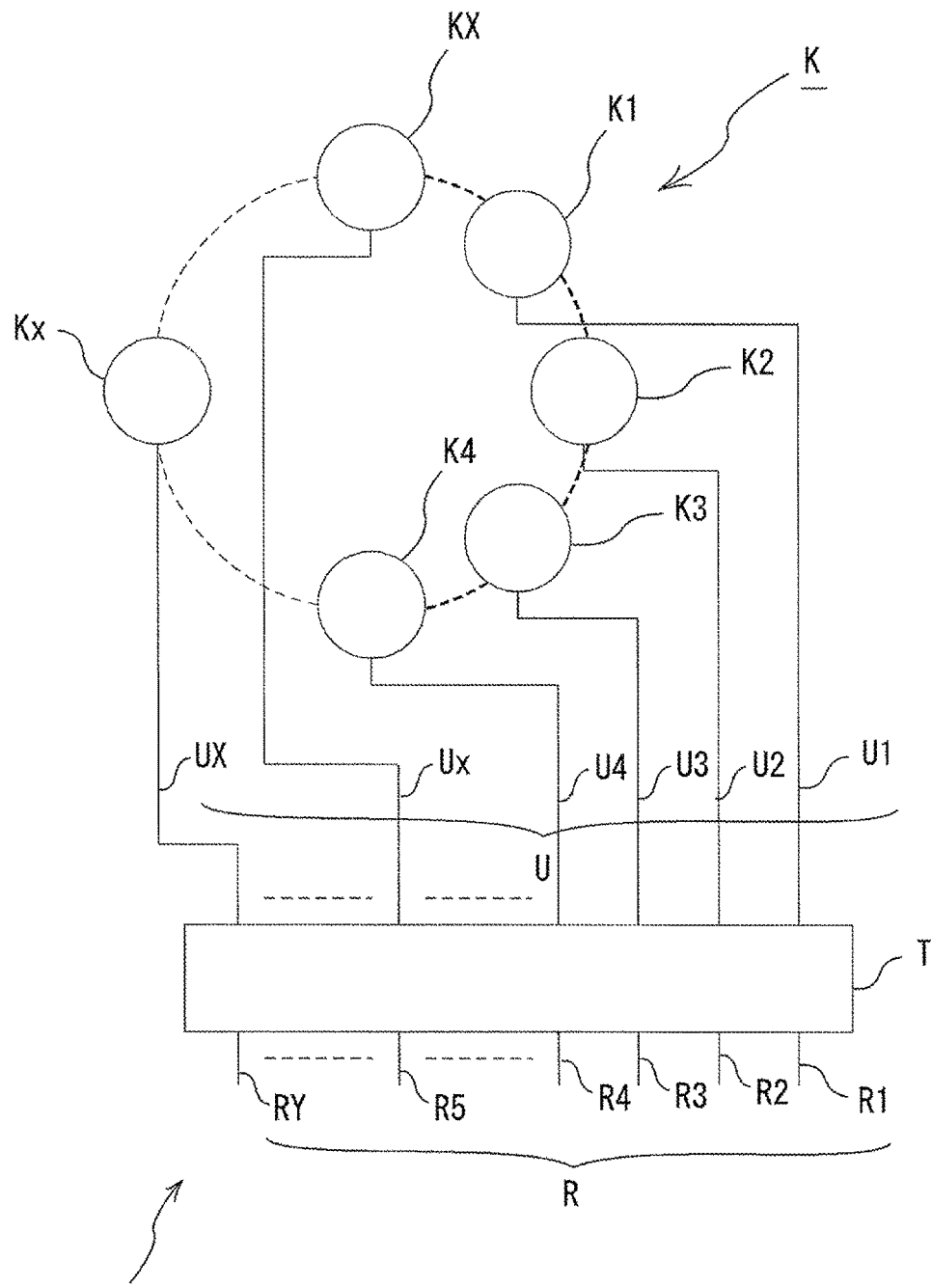
FIG. 9 is a view showing the structure of a wireless receiving antenna according to a third exemplary embodiment.

As shown in FIG. 9, a wireless receiving antenna 20 includes a signal receiving means K having X number of antenna elements K1, ..., KX (where X is an integer of 2 or more) that are equally spaced on the circumference of circle, a signal synthesis circuit (signal synthesis means) T for synthesizing a first signal Q from X number of second signals P1, ..., PX with equal power that are received from the antenna elements K1, ..., KX, respectively, and a signal output means R having Y number of signal output ports R1, ..., RY (where Y is a positive integer satisfying Y≤X) for outputting the first signal Q. By this structure, the wireless receiving antenna 20 outputs the received spiral beam H as the first signal Q from the signal output ports R1, ..., RY. The number X of the antenna elements K1, ..., KX may be greater than the number N of the antenna elements A1, ..., AN in the wireless transmitting antenna 10.

The antenna elements K1, ..., KX are equally spaced on the circumference of circle with a diameter of 30 cm, for example. Those plurality of antenna elements K1, ..., KX constitute the signal receiving means K. A parabolic antenna may be used as each of the antenna elements K1, ..., KX, for example. The signal receiving means K and the signal synthesis circuit T are connected through a signal waveguide U. The signal waveguide U has X number of signal lines U1, ..., UX with equal length. The signal lines U1, ..., UX connect X number of signal input ports V1, ..., VX of the signal synthesis circuit T and the antenna elements K1, ..., KX. Coaxial cables or waveguides may be used as the signal lines U1, ..., UX.

The signal synthesis circuit T synthesizes a signal from the second signals P1, ..., PX with equal power that are input from the plurality of signal input ports V1, ..., VX and outputs the synthesized signal as the first signal Q from any of the signal output ports R1, ..., RY in accordance with the spiral pitch of the spiral beam H. A Butler matrix feeding circuit may be used as the signal synthesis circuit T, for example. The signal synthesis circuit T has the same structure as the signal distribution circuit B in the wireless transmitting antenna 10 (see FIG. 2). Thus, if the second signals P1, ..., PX are input to the signal distribution circuit B in an opposite manner, the first signal Q is synthesized and output, which is the operation of the signal synthesis circuit T. Therefore, the wireless receiving antenna 20 can output the spiral beam H as the first signal Q by the operation opposite to the operation of the wireless transmitting antenna 10.

Specifically, the spiral beam whose equiphase surface is inclined spirally which is received by the signal receiving means K having the X number of antenna elements K1, ..., KX equally spaced on the circumference of circle is input as the X number of second signals P1, ..., PX to the signal synthesis circuit T from the X number of antenna elements K1, ..., KX, respectively, and the signal synthesis circuit T adds a phase difference to each of the X number of second signals P1, ..., PX, synthesizes the first signal Q therefrom, and outputs the first signal Q. Then, the signal synthesis circuit T adds a specified phase difference to the X number of second signals P1, ..., PX that are input from the antenna elements adjacent in the signal receiving means K so that the phase difference decreases in decremental steps in the circumferential direction.

Although an example of using a Butler matrix feeding circuit for the signal synthesis circuit T is shown in the above description, any circuit may be used as long as it can receive the spiral beam H from each of the antenna elements K1, ..., KX equally spaced on the circumference of circle and output the first signal Q. Further, the phase differences to be added to the second signals P1, ..., PX are not necessarily at equal intervals.

Figure 10:
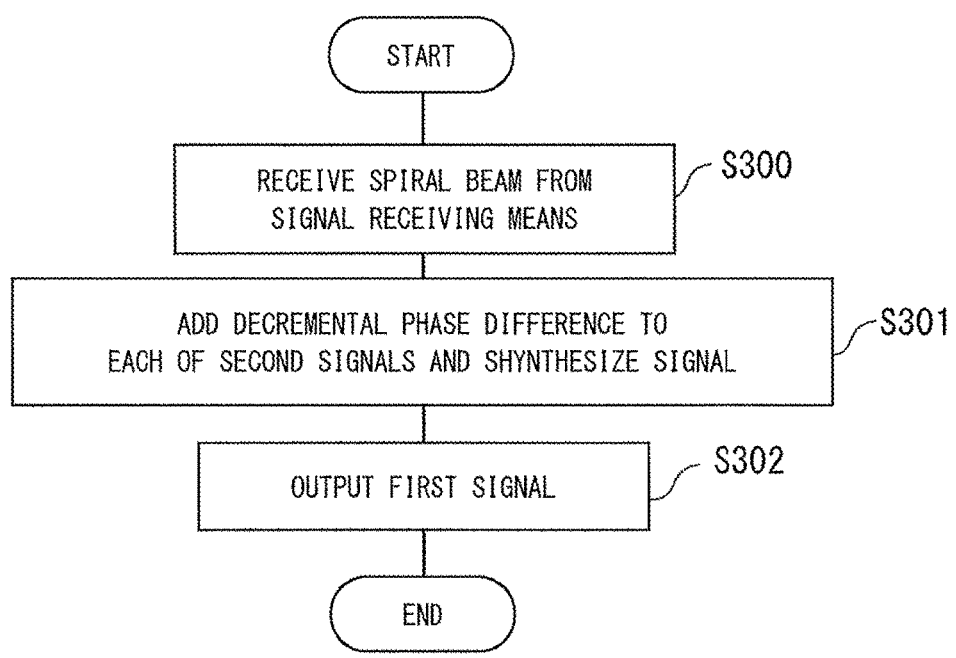
FIG. 10 is a flowchart showing a process of receiving a spiral beam by the wireless receiving antenna.

A process of receiving the spiral beam H by the wireless receiving antenna 20 is described hereinafter with reference to FIG. 10.

When the spiral beam H is transmitted from the wireless transmitting antenna 10, the wireless receiving antenna 20 sequentially receives the second signals P1, ..., PX in a certain twist direction from the X number of antenna elements K1, ..., KX, respectively, that are equally spaced on the circumference of circle (S300). Because an incremental phase difference has been added to each of the second signals P1, ..., PX, the signal synthesis circuit T adds a decremental phase difference, inversely to the incremental phase difference, to each of the second signals P1, ..., PX and synthesizes therefrom (S301). The signal synthesis circuit T outputs the first signal Q from any of the signal output ports R1, ..., RY (S302).

As described above, according to the wireless receiving antenna 20, it is possible to output the received spiral beam H as the first signal Q.

Fourth Exemplary Embodiment

The wireless receiving antenna 20 can receive Y number of multiplexed spiral beams H with different spiral pitches that are transmitted by the wireless transmitting antenna 10 in the second exemplary embodiment and output them as Y number of first signals Q. In the following description, the same names and symbols are used for the parts that are the same as those in the other exemplary embodiments, and the redundant description is omitted as appropriate.

Figure 11:
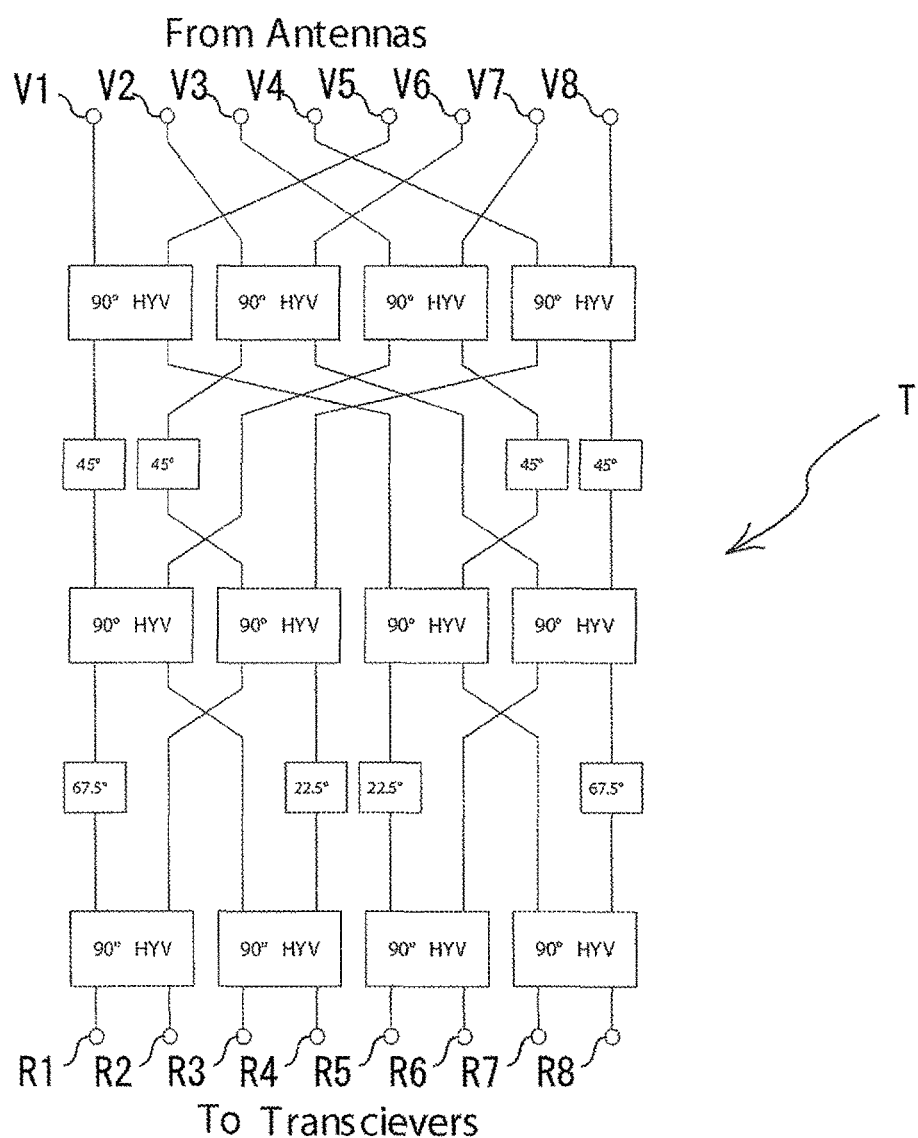
FIG. 11 is a view showing the structure of a signal synthesis circuit included in a wireless receiving antenna according to a fourth exemplary embodiment.

As shown in FIG. 11, the wireless receiving antenna 20 includes a signal synthesis circuit T having a plurality of signal input ports V1, ..., VX and a plurality of signal output ports R1, ..., RY. The structure of the signal synthesis circuit T that has a Butler matrix feeding circuit where X=8 and Y=8 is shown in this example. The signal synthesis circuit T has the same structure as the signal distribution circuit B in the second embodiment. Specifically, when the signal synthesis circuit T receives Y number of spiral beams with different spiral pitches, it adds linear phase differences having slopes that are inverse of the slopes corresponding to the signal output ports R1, ..., RY to the X number of received second signals P1, ..., PX, respectively, synthesizes the Y number of first signals Q therefrom, and outputs the Y number of first signals Q from the signal output ports R1, ..., RY, respectively, by the opposite operation to the signal distribution circuit B.

Figure 12:
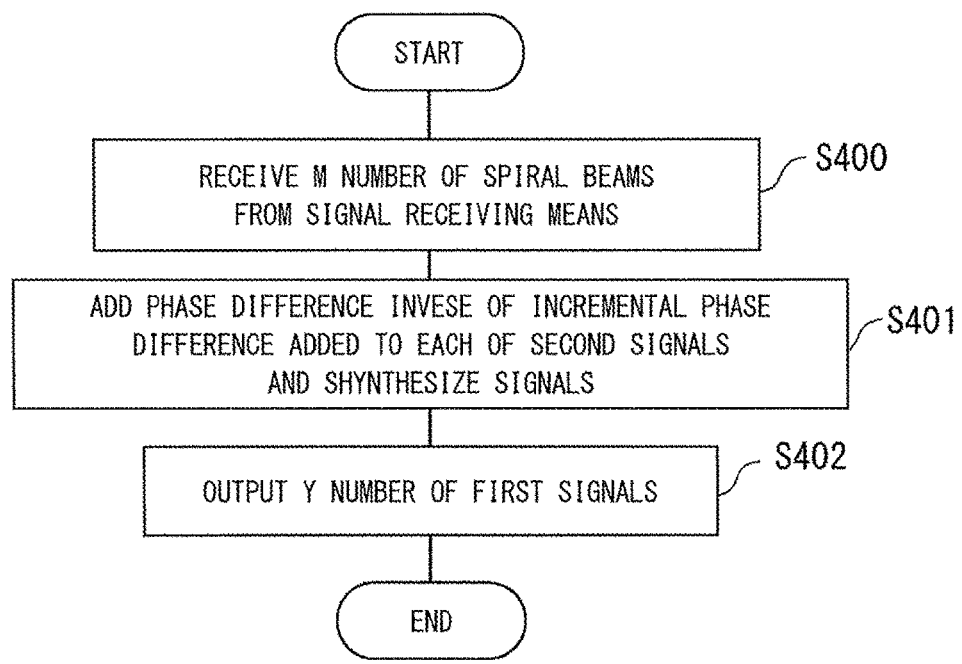
FIG. 12 is a flowchart showing a process of receiving M number of different spiral beams by the wireless receiving antenna.

A process of receiving signals containing Y number of spiral beams H with different spiral pitches by the wireless receiving antenna 20 is described hereinafter with reference to FIG. 12.

When the Y number of spiral beams H with different spiral pitches are transmitted from the wireless transmitting antenna 10, the wireless receiving antenna 20 receives the second signals P1, ..., PX in a certain twist direction respectively from the X number of antenna elements K1, ..., KX that are equally spaced on the circumference of circle (S400). Because an incremental phase difference has been added to the second signals P1, ..., PX, the signal synthesis circuit T adds a decremental phase difference, inversely to the incremental phase difference, to each of the second signals P1, ..., PX and synthesizes the first signals Q therefrom (S401). The signal synthesis circuit T outputs the Y number of first signals Q from the signal output ports R1, ..., RY (S402).

As described above, according to the wireless receiving antenna 20, it is possible to receive the Y number of multiplexed spiral beams H with different spiral pitches that are transmitted by the wireless transmitting antenna 10 and output them as the Y number of first signals Q.

Fifth Exemplary Embodiment

By the wireless transmitting antenna 10 and the wireless receiving antenna 20 described above, it is possible to wirelessly transmit and receive signals using the spiral beams H.

Figure 13:
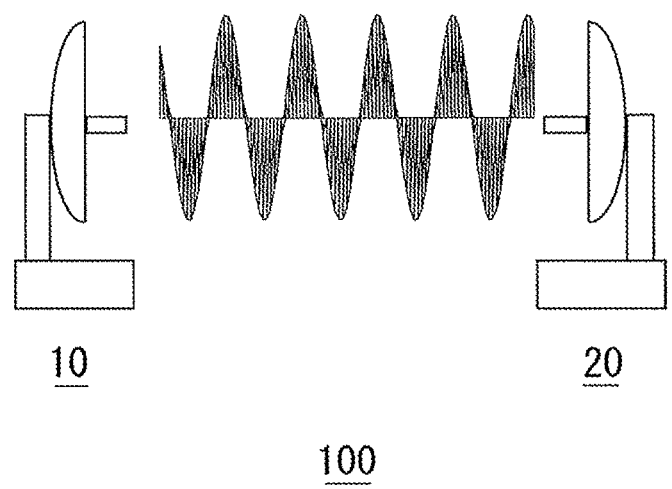
FIG. 13 is a view showing the structure of a wireless transmitting and receiving system according to a fifth exemplary embodiment.

As shown in FIG. 13, a wireless transmitting and receiving system 100 includes the wireless transmitting antenna 10 and the wireless receiving antenna 20. According to the wireless transmitting and receiving system 100, it is possible to transmit and receive signals containing Y number of multiplexed spiral beams H with different spiral pitches.

Sixth Exemplary Embodiment

As described in Non Patent Literature 2, the spiral beam H increases in outside diameter like a torus as the transmitting and receiving distance becomes longer. On the other hand, the diameter of the circumference where the antenna elements K1, ..., KX are placed of the wireless receiving antenna 20 may be changed based on the transmitting and receiving distance. For example, the diameter of the circumference of the wireless receiving antenna 20 may be enlarged when the transmitting and receiving distance is long. Further, in order to suppress an increase in the outside diameter of the spiral beam H, the diameter of the circumference where the antenna elements A1, ..., AN are placed of the wireless transmitting antenna 10 may be changed based on the transmitting and receiving distance. For example, the diameter of the circumference of the wireless transmitting antenna 10 may be enlarged when the transmitting and receiving distance is long.

Seventh Exemplary Embodiment

Figure 14:
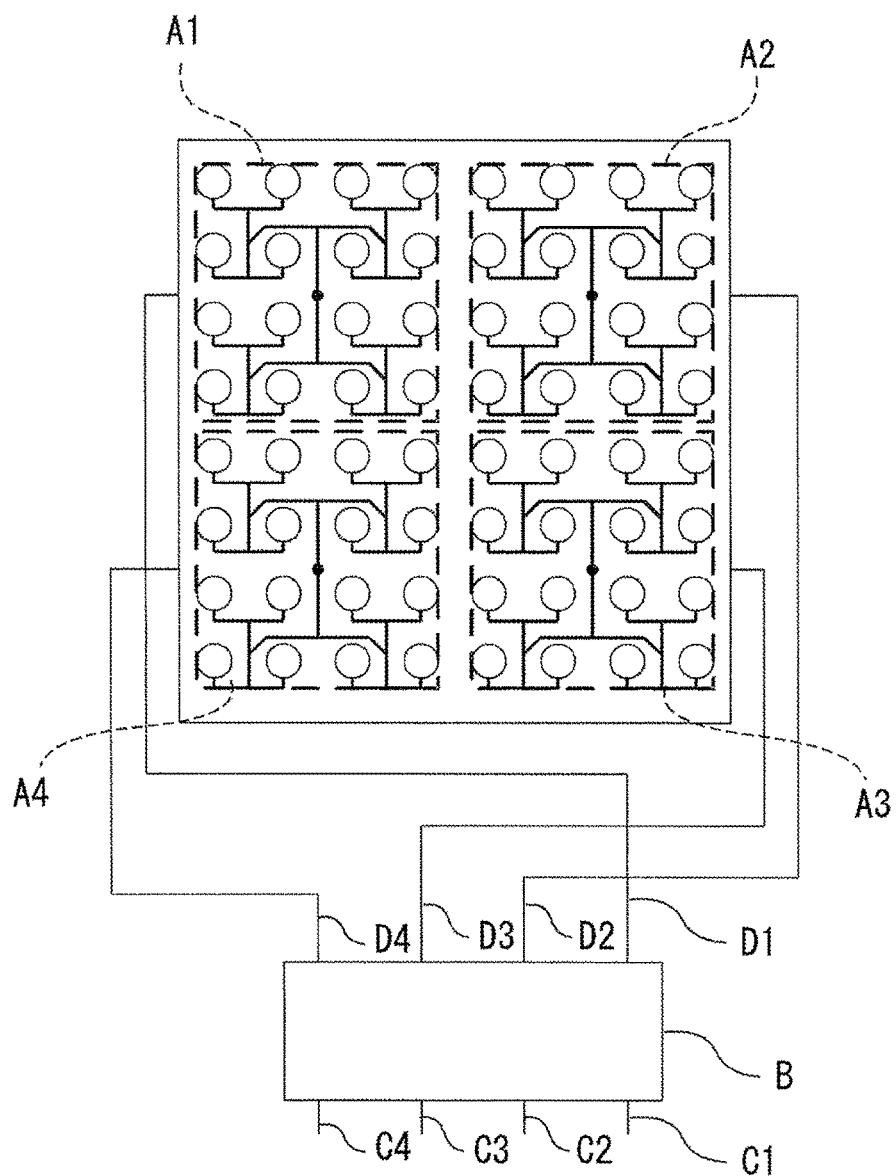
FIG. 14 is a view showing a modified example of a wireless transmitting antenna according to a seventh exemplary embodiment.

As shown in FIG. 14, the antenna elements A1, ..., AN of the wireless transmitting antenna 10 may be a sub-array of an array antenna, instead of a parabolic antenna, which forms a wireless transmitting antenna 40. Likewise, the antenna elements K1, ..., KX of the wireless receiving antenna 20 may be a sub-array of an array antenna, instead of a parabolic antenna (not shown).

Eighth Exemplary Embodiment

Figure 15:
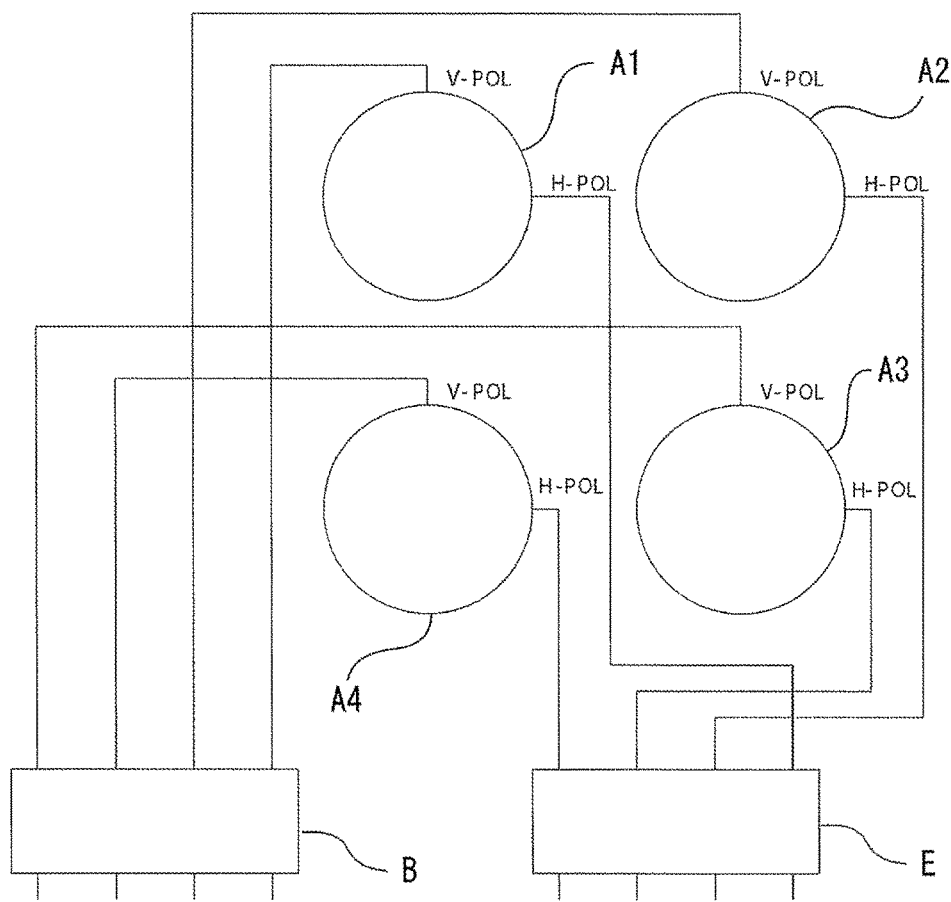
FIG. 15 is a view showing the structure of a wireless transmitting antenna according to an eighth exemplary embodiment.

As shown in FIG. 15, a wireless transmitting antenna 30 includes M number of other signal input ports Z1, ..., ZN for inputting M number of different other first signals W orthogonal to the first signal S for forming a spiral beam J which is an orthogonally polarized wave of the spiral beam H transmitted by the wireless transmitting antenna 10, and another signal distribution circuit E that receives other first signals W and outputs N number of other second signals F1, ..., FN orthogonal to the second signals G1, ..., GN. The wireless transmitting antenna 30 can thereby transmit a spiral beam I with VH-polarized waves. With use of a wireless receiving antenna (not shown) having the same structure as the wireless transmitting antenna 30, it is possible to receive the spiral beam I with VH-polarized waves and output M number of first signals and M number of different other first signals.

It should be noted that the present invention is not limited to the above-described exemplary embodiment and may be varied in many ways within the scope of the present invention. For example, for the antenna elements A1, ..., AN and the antenna elements K1, ..., KX, dipole antennas, helix antenna or horn antennas may be used, for example, besides those described in the above exemplary embodiments. Further, for the antenna elements K1, ..., KX at the receiving end, Yagi antennas may be used.

Although the present invention is described as a hardware configuration in the above exemplary embodiments, the present invention is not limited thereto. The present invention may be implemented by performing given processing by DSP (Digital Signal Processing), and it can be implemented by executing a program on DSP (Digital Signal Processor) or implemented with a logic circuit configured on FPGA (Field Programmable Gate Array) or ASIC (Application Specific Integrated Circuit).

The program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

10 WIRELESS TRANSMITTING ANTENNA
20 WIRELESS RECEIVING ANTENNA
30 WIRELESS TRANSMITTING ANTENNA
40 WIRELESS TRANSMITTING ANTENNA
50 OAM ANTENNA
51 REFLECTING UNIT
100 WIRELESS TRANSMITTING AND RECEIVING SYSTEM

A SIGNAL EMITTING MEANS
A1, ..., AN ANTENNA ELEMENT
B SIGNAL DISTRIBUTION CIRCUIT
B1, ..., BN SIGNAL EMITTING PORT
C1, ..., CM SIGNAL INPUT PORT
D SIGNAL WAVEGUIDE
D1, ..., DN SIGNAL LINE
E SIGNAL DISTRIBUTION CIRCUIT
F1, ..., FN OTHER SECOND SIGNAL
G1, ..., GN SECOND SIGNAL
H SPIRAL BEAM
H1, ..., HM SPIRAL BEAM
I SPIRAL BEAM
J SPIRAL BEAM
K SIGNAL RECEIVING MEANS
K1, ..., KX ANTENNA ELEMENT
M INTEGER
N INTEGER
P1, ..., PX SECOND SIGNAL
Q FIRST SIGNAL
R SIGNAL OUTPUT MEANS
R1, ..., RY SIGNAL OUTPUT PORT
S1, ..., SM FIRST SIGNAL
T SIGNAL SYNTHESIS CIRCUIT
W FIRST SIGNAL
X INTEGER
Y INTEGER
Z1, ..., ZN SIGNAL INPUT PORT

The invention claimed is:

1. A wireless signal transmitting antenna comprising:
a signal emitter configured to have N number of antenna elements (where N is an integer satisfying N≥2) equally spaced on a circumference of a circle;
a first signal distributor configured to generate, from an input first signal, N number of second signals having a phase difference from one another, and output the N number of second signals to the N number of antenna elements, respectively, so that a spiral beam with an equiphase surface inclined spirally is output from the signal emitter; and
a second signal distributor configured to receive a third signal having a phase orthogonal to that of the first signal, and output N number of fourth signals having phases orthogonal to those of the second signals so that orthogonally polarized waves of the spiral beam are formed by the signal emitter,
wherein when M number of different first signals (where M is an integer satisfying M≤N) and M number of different third signals are input, the first signal distributor and the second signal distributor generate and output the second signals and the fourth signals to each of the N number of antenna elements, respectively, so that M number of different spiral beams are output from the signal emitter, and
wherein the first signal distributor and the second signal distributor distribute the second signals and the fourth signals, respectively, so that signals having a specified phase difference, which increases in an incremental manner in a circumferential direction, are input to adjacent antenna elements in the signal emitter.

2. The wireless signal transmitting antenna according to claim 1, wherein a diameter of the circumference where the antenna elements are placed is changed based on a signal transmitting and receiving distance.

3. A wireless signal transmitting system comprising:
a signal emitter configured to output a transmission signal by N number of antenna elements (where N is an integer satisfying N≥2) equally spaced on a circumference of a circle;
a first signal distributor configured to generate, from an input first signal, N number of second signals having a phase difference from one another, and output the N number of second signals to the N number of antenna elements, respectively, so that a spiral beam with an equiphase surface inclined spirally is output from the signal emitter; and
a second signal distributor configured to receive a third signal having a phase orthogonal to that of the first signal, and output N number of fourth signals having phases orthogonal to those of the second signals so that orthogonally polarized waves of the spiral beam are formed by the signal emitter,
wherein when M number of different first signals (where M is an integer satisfying M≤N) and M number of different third signals are input, the first signal distributor and the second signal distributor generate and output the second signals and the fourth signals to each of the N number of antenna elements, respectively, so that M number of different spiral beams are output from the signal emitter, and
wherein the first signal distributor and the second signal distributor distribute the second signals and the fourth signals, respectively, so that signals having a specified phase difference, which increases in an incremental manner in a circumferential direction, are input to adjacent antenna elements in the signal emitter.

4. A wireless signal transmitting method comprising:
generating, from an input first signal, N number of second signals having a phase difference from one another;
outputting the N number of second signals to N number of antenna elements, respectively, so that a spiral beam with an equiphase surface inclined spirally is output from a signal emitter having the N number of antenna elements (where N is an integer satisfying N≥2) equally spaced on a circumference of a circle;
generating, from an input third signal having a phase orthogonal to that of the first signal, N number of fourth signals having phases orthogonal to those of the second signals having a phase difference from one another; and
outputting N number of the fourth signals so that orthogonally polarized waves of the spiral beam are formed by the signal emitter,
wherein when M number of different first signals (where M is an integer satisfying M≤N) and M number of different third signals are input, the second signals and the fourth signals are generated and output to each of the N number of antenna elements, respectively, so that M number of different spiral beams are output from the signal emitter, and
wherein the second signals and the fourth signals are distributed, respectively, so that signals having a specified phase difference, which increases in an incremental manner in a circumferential direction, are input to adjacent antenna elements in the signal emitter.

5. The wireless signal transmitting method according to claim 4, wherein a diameter of the circumference where the antenna elements are placed is changed based on a signal transmitting and receiving distance.

6. The wireless signal transmitting system according to claim 3, wherein a diameter of the circumference where the antenna elements are placed is changed based on a signal transmitting and receiving distance.

* * * * *

UNITED STATES PATENT AND TRADEMARK OFFICE
CERTIFICATE OF CORRECTION

Page 1 of 1

PATENT NO. : 10,177,829 B2
APPLICATION NO. : 15/519955
DATED : January 8, 2019
INVENTOR(S) : Masashi Hirabe and Tsuguo Maru It is certified that error appears in the above-identified patent and that said Letters Patent is hereby corrected as shown below:

In the Specification

Column 5, Description of Embodiments, Line 17; Delete "ON" and insert --θN-- therefor Signed and Sealed this
Eighteenth Day of June, 2019

Andrei Iancu
*Director of the United States Patent and Trademark Office*